Feb. 21, 1928.
W. H. TONCRAY
1,659,673
WINDSHIELD BRACKET
Filed Feb. 26, 1926
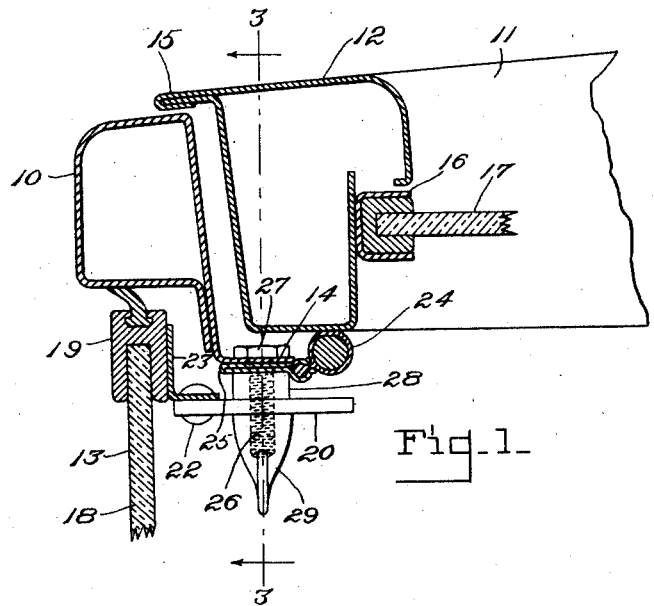
Fig-1-
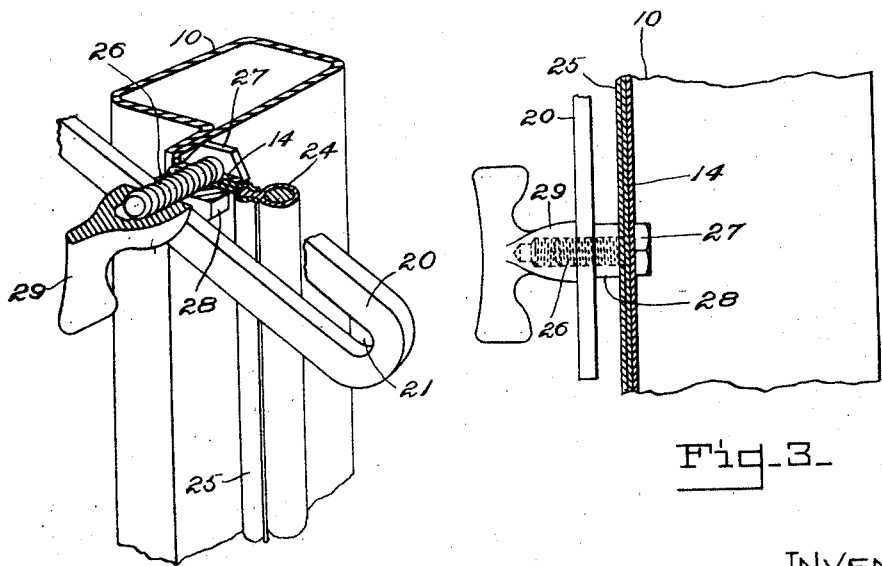
Fig-2-
Fig-3-
INVENTOR=
Willard H. Toncray.
By Meadows, Culver, Copeland & Pike.
ATTORNEYS Patented Feb. 21, 1928.

1,659,673

UNITED STATES PATENT OFFICE.

MILLARD H. TONCRAY, OF DETROIT, MICHIGAN, ASSIGNOR TO HUDSON MOTOR CAR COMPANY, OF DETROIT, MICHIGAN, A CORPORATION OF MICHIGAN.

WINDSHIELD BRACKET.

Application filed February 26, 1926. Serial No. 90,766.

This invention relates to devices employed in automobile bodies for securing the windshield in adjusted position, and has for its general object to provide a simple and inexpensive device of this character which can be assembled in the body with a minimum expenditure of time and labor, but which will nevertheless perform its intended function in a satisfactory and convenient manner. The more particular objects of the invention will best be understood from the following description of a preferred form thereof illustrated in the accompanying drawings, in which:

Fig. 1 is a horizontal sectional view taken through the right forward corner of a closed automobile body having the invention applied thereto.

Fig. 2 is a fragmentary sectional perspective view of the front pillar and associated parts.

Fig. 3 is a vertical section taken substantially on the line 3—3, Fig. 1, with the door omitted.

The invention is herein shown as applied to a closed metal automobile body having a front pillar 10, a door 11 including a forward door pillar or upright 12 which closes against the rear side of the pillar 10, and a windshield 13 which closes against the front side of the pillar 10. As shown, the pillar 10 is of sheet metal construction having a boxed cross section and formed at its rear inner corner with a rearwardly extending flange 14. The pillar or upright 12 of the door 11 as shown is also of sheet metal construction having at its outer or forward side a flange 15 to overlap and engage the outer face of the pillar 10, the inner side of said upright lying adjacent the flange 14 of the front pillar when the door is closed as shown in Fig. 1. The door 11 as shown is also provided with guides 16 for the usual sliding window pane 17.

The windshield 13 comprises the usual glass pane or panel 18 enclosed by a suitable frame 19 which is hinged at its upper edge to the usual top header (not shown) which connects the tops of the front pillars 10 at the opposite side of the body. The windshield 13 has connected therewith an adjusting arm 20, said arm being shown as formed with a slot 21 (Fig. 2) and as pivoted at 22 to a bracket 23 secured to the windshield frame 19.

Carried by the flange 14 is a bolt having a threaded stem 26 which extends through said flange, and preferably also through a retainer 25 for a windlace 24, said stem having at opposite sides of said flange and windlace retainer a head 27 and a nut 28 by which the bolt is secured in place in the flange. The stem 26 extends past the arm 20, which lies adjacent the pillar 10 and flange 14, said stem being provided beyond said arm with a nut 29 for clamping said arm in adjusted position against the nut 28 which, in the construction shown, occupies a position between said arm on the one hand and the flange 14 and windlace retainer 25 on the other. Also, in the construction shown, the stem 26 extends through the slot 21 in the arm 20, and the nut 29 is in the form of a wing nut designed for convenient manual operation.

It will be seen that the device comprising the threaded bolt with its two nuts 28 and 29 is of extremely simple construction, including only three parts, but serves, nevertheless, as effective means for securing the windshield arm 20 in adjusted position. Adjustment of the windshield is readily effected by loosening the wing nut 29 without disturbing the nut 28 which secured the bolt in place.

Having thus described my invention, I claim:

In an automobile body, in combination, a front pillar having a flange, a windshield, an arm connected with said windshield and lying adjacent to said pillar, a threaded bolt extending through said flange and having a head and a nut at opposite sides of said flange for securing said bolt in place in said flange, one of said members being located between said flange and arm, and a second nut on said bolt beyond said arm for clamping the latter in adjusted position against said last named member.

In testimony whereof I affix my signature.

MILLARD H. TONCRAY.